United States Patent [19]

Ishizuka et al.

[11] Patent Number: 5,569,913

[45] Date of Patent: Oct. 29, 1996

[54] OPTICAL DISPLACEMENT SENSOR

[75] Inventors: Koh Ishizuka, Omiya; Yasushi Kaneda, Utsunomiya, both of Japan

[73] Assignee: Canon Kabushiki Kaisha, Tokyo, Japan

[21] Appl. No.: 429,236

[22] Filed: Apr. 25, 1995

[30] Foreign Application Priority Data

Apr. 27, 1994 [JP] Japan .................................. 6-089990

[51] Int. Cl.⁶ ...................................................... H01J 3/14
[52] U.S. Cl. ...................... 250/237 G; 250/205; 356/356
[58] Field of Search ............................... 250/237 G, 548, 250/205, 559.3, 559.29; 356/356, 373, 375; 359/566, 569, 572, 577, 583, 584

[56] References Cited

U.S. PATENT DOCUMENTS

| 4,176,276 | 11/1979 | Kaul et al. ........................... 250/237 G |
| 4,998,798 | 3/1991 | Ishizuka et al. ....................... 250/237 G |
| 5,059,791 | 10/1991 | Ishizuka et al. ................... 250/231.17 |
| 5,283,434 | 2/1994 | Ishizuka et al. ....................... 250/237 G |
| 5,390,022 | 2/1995 | Ishizuka et al. ......................... 356/356 |

Primary Examiner—Que T. Le
Attorney, Agent, or Firm—Fitzpatrick, Cella, Harper & Scinto

[57] ABSTRACT

An apparatus for detecting a displacement of a diffraction grating set on a measured object, comprises a light-emitting device, a separation optical element for separating a beam from the light-emitting device into a plurality of beams, a multiplexing optical element for multiplexing light beams diffracted by the diffraction grating from two beams out of the plurality of beams, a first detecting unit for detecting interference light generated when the beams of diffracted light are multiplexed by the multiplexing optical element and outputting a signal related to relative displacement information to the diffraction grating, and a second detecting unit for outputting a signal related to different information from the relative displacement information to the diffraction grating, based on a change in a diffracted light quantity of diffracted light by the diffraction grating from another beam out of the plurality of beams and/or another diffracted light by the diffraction grating from the two beams.

8 Claims, 6 Drawing Sheets

OPTICAL DISPLACEMENT SENSOR

BACKGROUND OF THE INVENTION

1. Field of the Invention

The present invention concerns an optical displacement sensor. The present invention is suitably applicable particularly to encoders for measuring a displacement of an object, velocity sensors, acceleration sensors, and length measuring apparatus, utilizing such an effect that when a light beam projected toward a moving object is diffracted or scattered, the diffracted or scattered beam is subject to phase modulation according to a displacement or a moving speed of the object.

2. Related Background Art

There are conventionally used apparatus which are arranged in such a manner that light is projected toward an object and that interference between light beams diffracted or scattered therefrom is utilized to obtain a physical amount such as movement or displacement of the object with high accuracy; for example, optical encoders, laser Doppler velocimeters, laser interferometers, etc.

Features of these apparatus utilizing the light are high accuracy and high resolution in the wavelength-of-light order, but in order to be applied in wider fields, they are required to add a size reduction (the size of millimeter order); stability, "handleability," and durability of an interference optical system; and an origin detecting function.

The present applicant disclosed the optical encoder shown in FIG. 1 as an example having an optical system which is simple, stable, easy to handle, and suitable for miniaturization among high-accuracy optical linear encoders utilizing the interference between diffracted light. In detail, a divergent beam R emitted from a light-emitting device 1 such as LED is converted into a linearly converging beam R' by an anamorphic optical element 2 (for example, a toric lens), the converging beam is thereafter split into two beams R1, R2 by a first diffraction grating G1 on a transparent substrate 4, the beams are then linearly converged to impinge on points P1, P2 on a diffraction grating G2 on a relatively moving scale 20, two beams R1 (+) (+ first-order diffracted light from the point P1) and R2 (−) (− first-order diffracted light from the point P2) reflection-diffracted there are arranged to intersect with each other on a diffraction grating G3 provided on a same plane as the diffraction grating G1, and the beam R2 (−) travels straight while the beam R1 (+) is diffracted in the− first order, so as to superimpose wavefronts thereof on each other to interfere with each other, thus emerging therefrom. The diffraction grating G3 is composed of gratings G3a, G3b, G3c, G3d of same pitches and phases $\pi K/4$ shifted to each other, and beams multiplexed by the respective gratings is detected by photodetectors PD1, PD2, PD3, PD4. The photodetectors output respective sinusoidal signals with phases $\pi/4$ shifted to each other with a displacement of the diffraction grating G2, and an amount of relative displacement of the scale 20 is measured by processing the signals in a signal processing unit PS by a well-known method.

Employment of this optical system achieves an encoder which is easy to handle while keeping the high accuracy, and which is stable in interference state even with a relative positional deviation (e.g., an angular shift such as azimuth, swing or tilt, etc.) between "the diffraction grating G2 on the scale" and "the detecting head portion consisting of the diffraction gratings G1, G3, the light-projection/reception devices, etc.".

There, however, occurs a need to fully control changes of ambient temperature and changes of quantity of emitted light due to degradation with time in order to employ LED excellent in anti-surge characteristics as a light source. Also, there has been a demand to add the origin detecting function to the encoder while keeping the size thereof compact.

SUMMARY OF THE INVENTION

To meet the demands heretofore as described above, a first object of the present invention is to provide an optical displacement sensor to which a system for generating a signal related to information other than the relative displacement to a measured object, as represented by detection of a change of emitted light quantity, detection of the origin, etc., is added without making the structure complicated, and to provide a drive system using it.

Other objects of the present invention will be apparent in the descriptive matter to follow.

DESCRIPTION OF THE PREFERRED EMBODIMENTS

Figure 1:
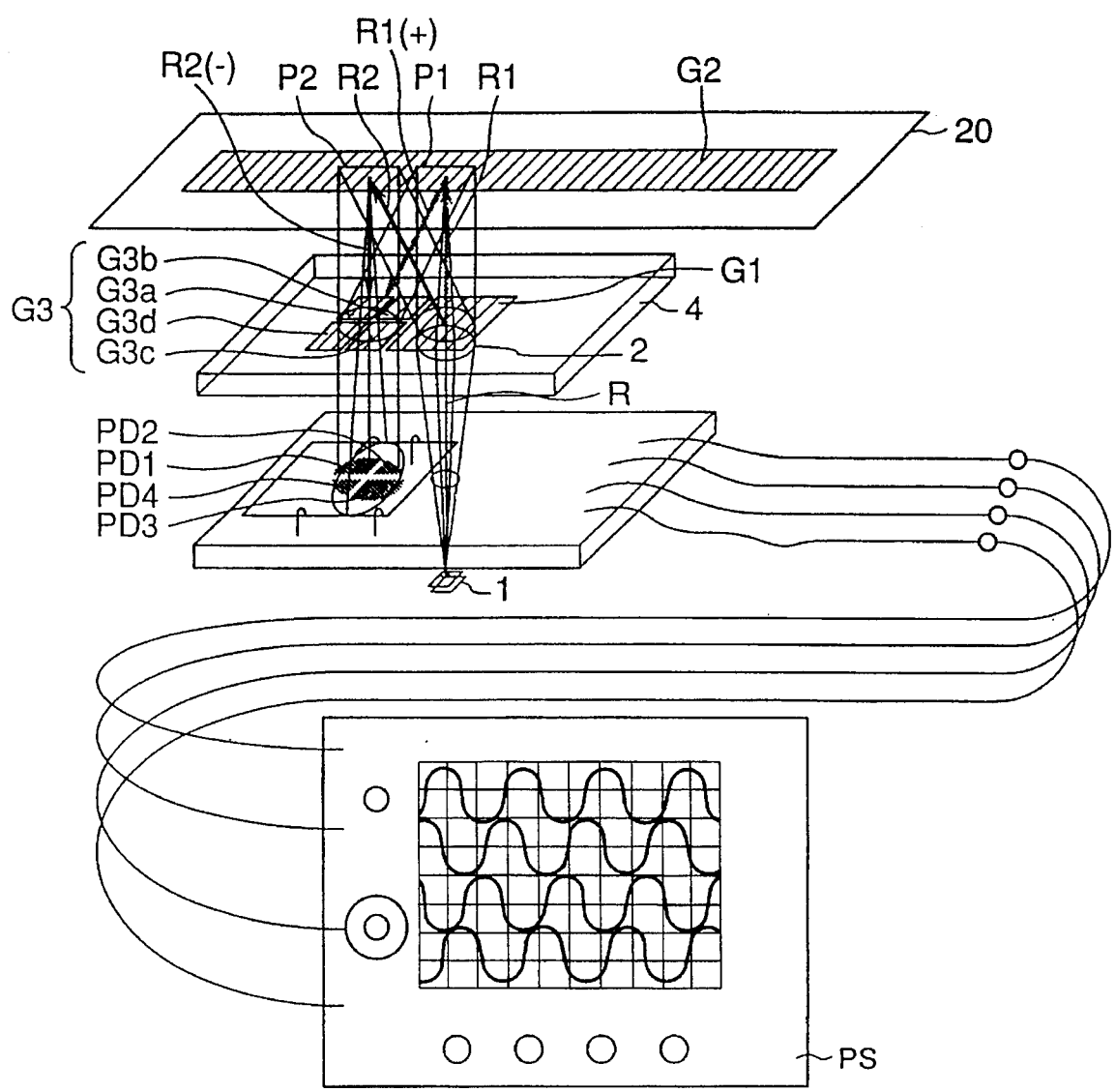
FIG. 1 is an explanatory drawing of a conventional example.
Figure 2:
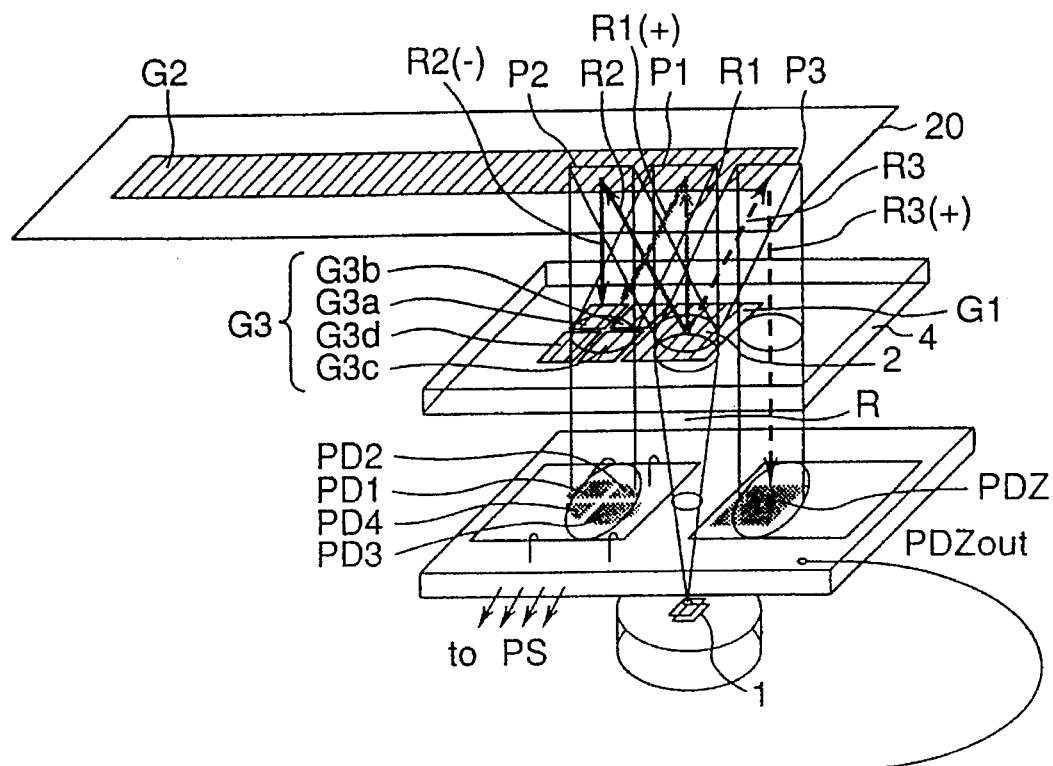
FIG. 2 is an explanatory drawing of an optical encoder as a first embodiment of the present invention.
Figure 2:
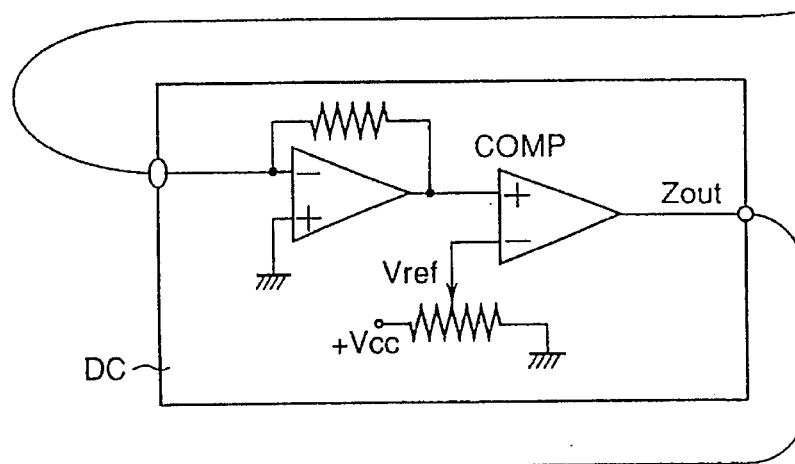
Figure 2:
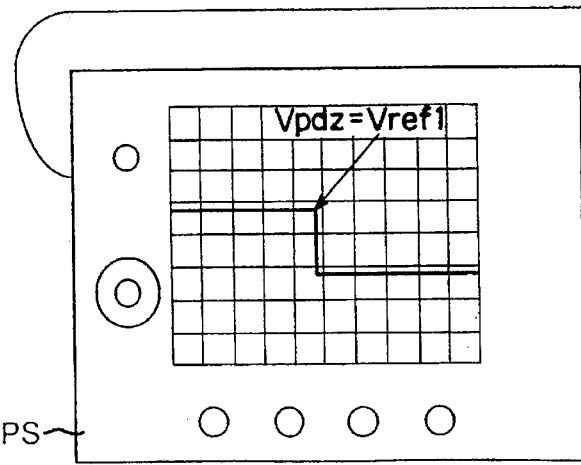

FIG. 2 is a structural drawing of an optical encoder accoding to the first embodiment of the present invention. Reference code 1 designates a light-emitting device (e.g., a light-emitting portion of a light-emitting diode), 2 an anamorphic optical element, G1 a diffraction grating for splitting a light beam (for example, of grating pitch P1=1.6 µm), G2 a diffraction grating on a scale (for example, of grating pitch P=1.6 µm), G3a, G3b, G3c, G3d diffraction gratings for multiplexing beams (for example, of grating pitch P3=1.6 µm and with a relative phase shift of $\pi/2$ to each other by shifting positions where the gratings are formed), 4 a transparent substrate on which the diffraction gratings G1, G3a to G3d and the optical element 2 are formed, PD1, PD2, PD3, PD4, PDZ photodetectors, 20 a scale attached to a detected object relatively moving, DC a detecting circuit, and PS a signal processing unit. The converging function of the anamorphic optical element 2 is set in the direction of grating lines in the diffraction grating G2 and is set to converge a beam in a linear pattern a little before or after it impinges upon the scale 20.

A divergent beam emitted from the light-emitting device 1 is converted into a linearly converging beam R' by the anamorphic optical element 2, and the converging beam R' is transmission-diffracted by the diffraction grating G1 formed on the surface of the transparent substrate 4 to be split into zeroth-order diffracted light R1, + first-order diffracted light R2, − first-order diffracted light R3, etc. and then to be emergent therefrom.

The beam R1 traveling straight through the diffraction grating G1 is reflection-diffracted at point P1 on the diffraction grating G2 formed on the scale 20 to generate +first-order reflection-diffracted light R1 (+). The diffracted light R1 (+) is phase-modulated with relative movement of the diffraction grating G2. The phase of the + first-order diffracted light R1 (+) is shifted by $+2\pi x/P$ for movement x of the scale. The +first-order diffracted light R1 (+) is transmission-diffracted by the diffraction grating G3 formed on the surface of the glass plate 4 to be split into a plurality of beams, among which + first-order diffracted light R1 (+)' is emergent approximately normal to the surface of the diffraction grating G3 therefrom.

The + first-order diffracted light beam R2 from the diffraction grating G1 is reflection-diffracted at point P2 on the diffraction grating G2 formed on the scale 20 to generate − first-order diffracted light R2 (−). The diffracted light R2 (−) is phase-modulated with relative movement of the diffraction grating G2. The phase of the − first-order diffracted light R2 (−) is shifted by $-2\pi x/P$ for movement x of the scale. Part of the − first-order diffracted light R2 (−) travels straight through the diffraction grating G3 formed on the surface of the glass plate 4 to be emergent as R2 (−)' approximately normal to the surface of the diffraction grating G3 therefrom.

In this manner, the beam R1 (+)' and the beam R2 (−)', optical paths of which are superimposed on each other through the diffraction grating G3, become interference light, which is incident to the photodetectors PD1 to PD4.

In this case the diffraction grating G3 is composed of four segments wavefront-split, which are given a phase difference of $\pi/2$ from each other by shifting the positions of gratings. Thus, since the wavefront of the beam R1 (+)' first-order-diffracted herein is split into four parts with a relative phase shift of $\pi/2$ to each other, the interference light impinging on the photodetectors PD1 to PD4 becomes periodic signals with a phase difference of $\pi/2$ from each other, so that a bright and dark signal of one cycle is generated every time the diffraction grating G3 on the scale 20 moves by a half of a pitch of the grating. The periodic signals from the respective photodetectors PD1 to PD4 are sent to the signal processing unit PS, and the signals are processed by a well-known method in the signal processing unit PS to measure an amount of relative displacement of the scale 20.

The − first-order diffracted light beam R3 from the diffraction grating G1 is reflection-diffracted at point P3 on the diffraction grating G2 formed on the scale 20 to generate + first-order diffracted light R3 (+). This diffracted light R3 (+) is modulated in quantity of light with relative movement of the grating edge of the diffraction grating G2. Namely, because a light quantity of reflection-diffracted light changes depending upon a ratio at which the diffraction grating is present in a beam-illuminated region of the diffracted light R3, a quantity of diffracted light decreases when the grating edge of the diffraction grating G2 passes near the point P3 with movement of scale. The photodetector PDZ is arranged to detect the change of light quantity and an output therefrom is compared with a set value Vref1 in a comparator COMP in the detecting circuit DC. The comparator COMP outputs a pulse (rectangular wave) signal when the output falls below the set value Vref1. By this, an origin detection signal (Zout) can be output when the diffracted light R3 comes to fall on the grating edge as the origin. The signal processing unit PS detects passage of the displacing origin of the scale 20 relatively moving, based on this signal.

Since the present embodiment is basically constructed by simply adding a photodetector (for detecting non-measuring diffracted light which was waste light heretofore) to the structure of the conventional example, the present embodiment has an effect to detect the origin even in a very simple and compact structure and additionally, includes the following advantages:

(1) The embodiment is compact and saves space and energy because it does not need an extra light source or light-projecting optical system for detecting the origin.

(2) Since waste diffracted light is utilized among the light beam projected for measuring the displacement amount, modulated light is obtained in a sufficient quantity of light and signals with good S/N are obtained, thus enhancing reproducibility accuracy.

(3) Since the edge of diffraction grating pattern on the scale is detected, no extra pattern needs to be recorded on the scale.

(4) Since the origin detecting photodetector PDZ can be mounted on the same surface (for example, on a same substrate) as the photodetectors PD1 to PD4 are, the structure is simple and an assembling property is good.

Figure 3:
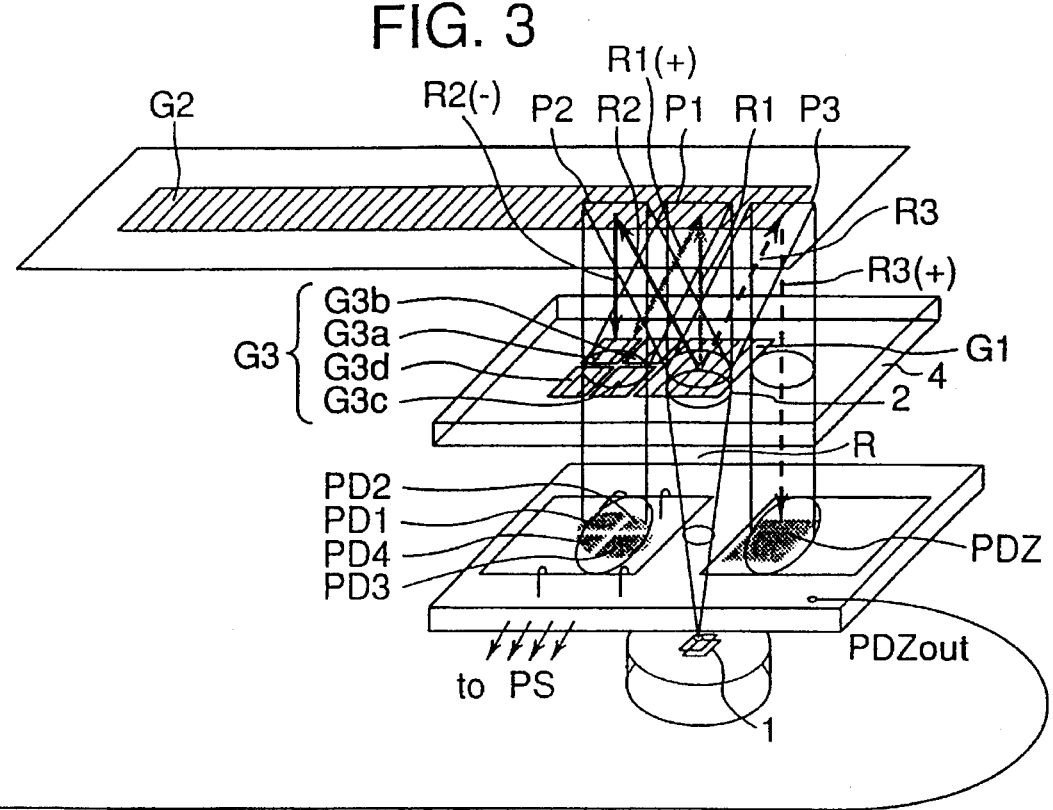
FIG. 3 is an explanatory drawing of a modification of the first embodiment.
Figure 3:
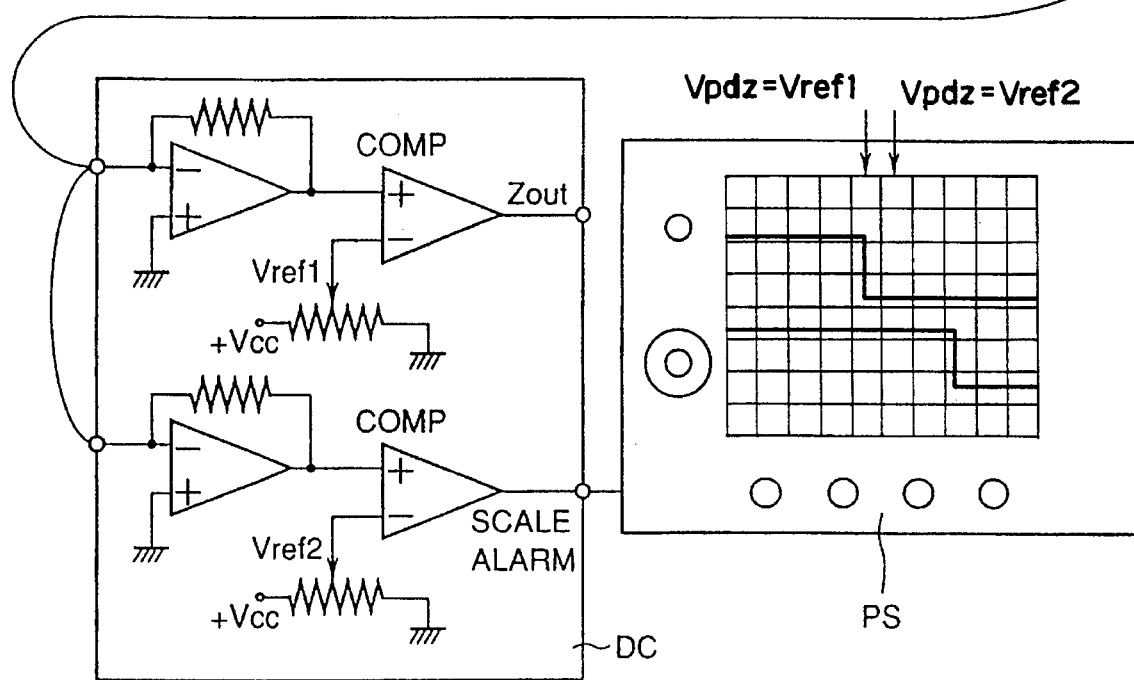

FIG. 3 shows a modification of the first embodiment. The same members as those in FIG. 2 are denoted by the same reference numerals and description thereof is omitted herein. In the present modification, another comparator COMP for comparison with another set value Vref2 is provided in parallel with the comparator COMP for comparison with the set value Vref1 in the detecting circuit DC. This apparatus is arranged in such a circuit structure that an alarm signal (SCALE ALARM) is output as a pulse signal when the output from the origin detecting photodetector PDZ becomes smaller than the another set value Vref2 because of a further decrease in quantity of reflection-diffracted light from the diffraction grating with further movement of the scale after generation of the origin detection signal Zout. Receiving the alarm signal, the signal processing unit PS outputs an alarm. This example has such a merit that in response to the alarm a proper measure can be taken to avoid an erroneous operation when the scale goes beyond the origin so as to make the beam-irradiated region off the grating-formed portion and before the portion for detecting the movement of grating becomes incapable of operating.

Figure 4:
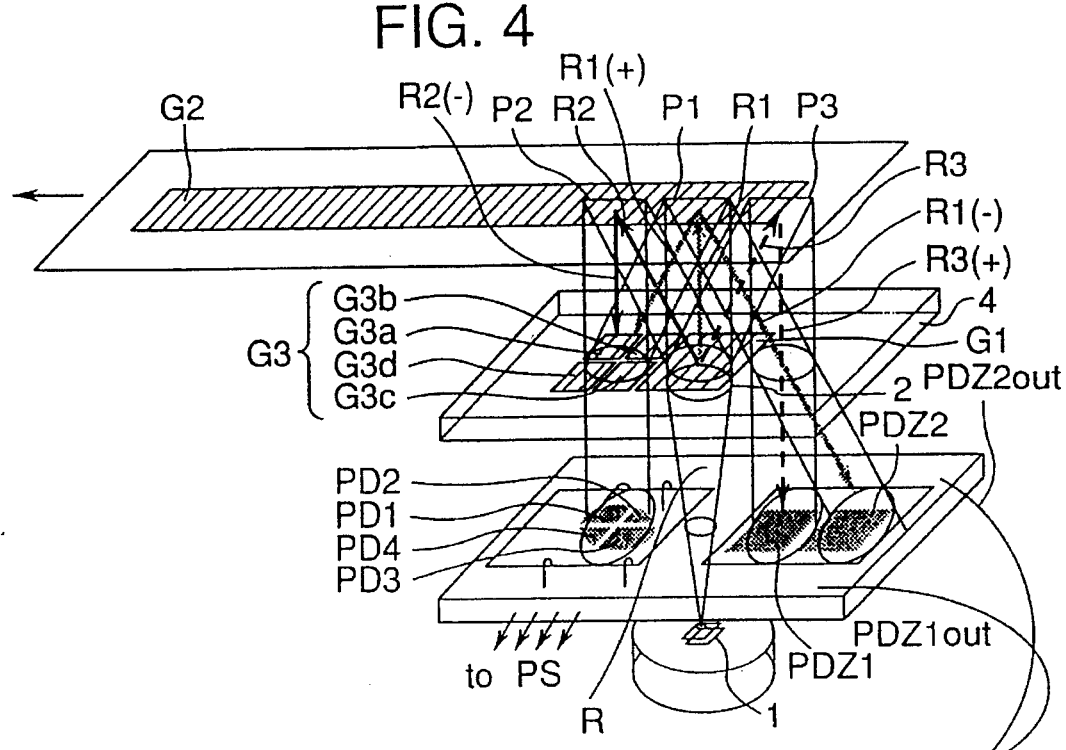
FIG. 4 is an explanatory drawing of another optical encoder as a second embodiment of the present invention.
Figure 4:
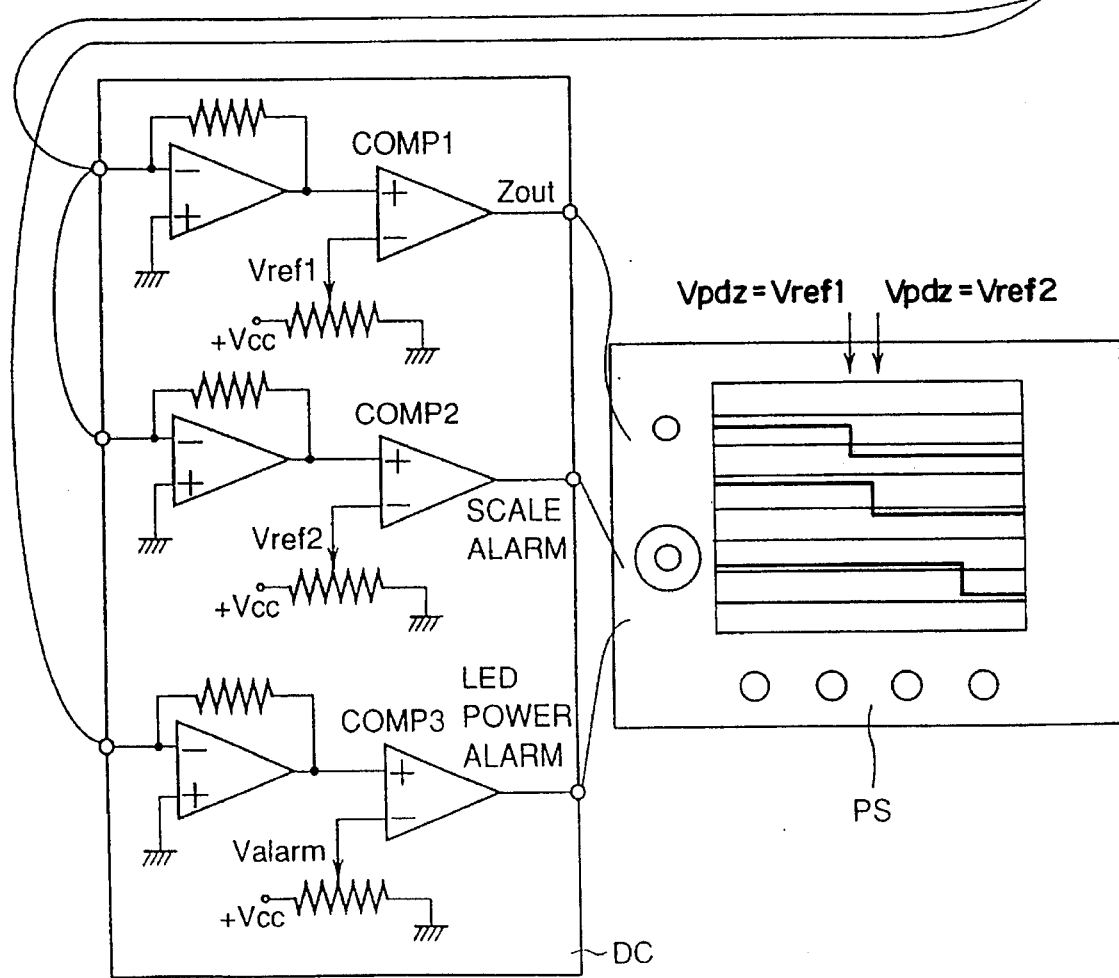

FIG. 4 is a structural drawing of an optical encoder according to the second embodiment of the present invention. Including redundancy of partial description with the above-described embodiment, the optical encoder will be described in detail. Reference code 1 designates a light-emitting device (e.g., a light-emitting portion of a light-emitting diode), 2 an anamorphic optical element, G1 a diffraction grating for splitting a beam (for example, of grating pitch P1 =1.6 μm), G2 a diffraction grating on the scale (for example, of grating pitch P=1.6 μm), G3a, G3b, G3c, G3d diffraction gratings for multiplexing beams (for example, of grating pitch P3=1.6 μm and with a relative phase shift of $\pi/2$ to each other by shifting positions where the gratings are formed), 4 a transparent substrate on which the diffraction gratings G1, G3a to G3d and the anamorphic optical element 2 are formed, PD1, PD2, PD3, PD4, PDZ1, PDZ2 photodetectors, and 20 a scale attached to a detected object relatively moving. The converging function of the anamorphic optical element 2 is set in the direction of grating lines in the diffraction grating G2 and is arranged to converge a beam in a linear pattern a little before or after it impinges upon the scale 20.

A divergent beam emitted from the light-emitting device 1 is converted into a linearly converging beam R' by the anamorphic optical element 2 and the converging beam R' is transmission-diffracted by the diffraction grating G1 formed on the surface of transparent substrate 4 to be split into zeroth-order diffracted light R1, + first-order diffracted light R2, − first-order diffracted light R3, etc. and then to be emergent therefrom.

The beam R1 traveling straight through the diffraction grating G1 is reflection-diffracted at point P1 on the diffraction grating G2 formed on the scale 20 to generate +first-order reflection-diffracted light R1 (+). The diffracted light R1 (+) is phase-modulated with relative movement of the diffraction grating G2. The phase of the + first-order diffracted light R1 (+) is shifted by $+2\pi x/P$ for movement x of the scale. The +first-order diffracted light R1 (+) is transmission-diffracted by the diffraction grating G3 formed on the surface of the glass plate 4 to be split into a plurality of beams, among which + first-order diffracted light R1 (+)' is emergent approximately normal to the surface of the diffraction grating G3 therefrom.

The + first-order diffracted light beam R2 from the diffraction grating G3 is reflection-diffracted at point P2 on the diffraction grating G2 formed on the scale 20 to generate − first-order diffracted light R2 (−). The diffracted light R2 (−) is phase-modulated with relative movement of the diffraction grating G2. The phase of the − first-order diffracted light R2 (−) is shifted by $-2\pi x/P$ for movement x of the scale. Part of the − first-order diffracted light R2 (−) passes straight through the diffraction grating G3 formed on the surface of the glass plate 4 so as to be emergent as R2 (−)' approximately normal to the surface of the diffraction grating G3 therefrom.

In this manner, the beam R1 (+)' and the beam R2 (−)', optical paths of which are superimposed on each other through the diffraction grating G3, become interference light, which is incident to the photodetectors PD1 to PD4.

In this case the diffraction grating G3 is composed of four segments wavefront-split, which are given a phase difference of $\pi/2$ from each other by shifting the positions of gratings. Thus, since the wavefront of the beam R1 (+)' first-order-diffracted herein is split into four parts with a relative phase shift of $\pi/2$ to each other, the interference light impinging on the photodetectors PD1 to PD4 becomes periodic signals with a phase difference of $\pi/2$ from each other, so that a bright and dark signal of one cycle is generated every time the diffraction grating G3 on the scale 20 moves by a half of a pitch of the grating. The periodic signals from the respective photodetectors PD1 to PD4 are sent to the signal processing unit PS, and the signals are processed by a well-known method in the signal processing unit PS to measure an amount of relative displacement of the scale 20.

The − first-order diffracted light beam R3 from the diffraction grating G1 is reflection-diffracted at point P3 on the diffraction grating G2 formed on the scale 20 to generate + first-order diffracted light R3 (+). This diffracted light R3 (+) is modulated in quantity of light with relative movement of the grating edge of the diffraction grating G2. Namely, because a light quantity of reflection-diffracted light changes depending upon a ratio at which the diffraction grating is present in a beam-illuminated region of the diffracted light R3, a quantity of diffracted light decreases when the grating edge of the diffraction grating G2 passes near the point P3 with movement of scale. The photodetector PDZ1 is arranged to detect the change of light quantity and an output therefrom is compared with a set value Vref1 in a comparator COMP1 in the detecting circuit DC. The comparator COMP1 outputs a pulse (rectangular wave) signal when the output falls below the set value Vref2. By this, an origin detection signal (Zout) can be output when the diffracted light R3 comes to fall on the grating edge as the origin. The signal processing unit PS detects passage of the displacing origin of the scale 20 relatively moving, based on this signal.

In the detection circuit DC another comparator COMP2 for comparison with another set value Vref2 is provided in parallel with the comparator COMP1 for comparison with the set value Vref2. According to this structure, an alarm signal (SCALE ALARM) is output as a pulse signal when an output from the origin detecting photodetector PDZ1 becomes smaller than the another set value Vref2 because of a further decrease in quantity of reflection-diffracted light from the diffraction grating with further movement of the scale after generation of the origin detecting signal Zout. Receiving this alarm signal, the signal processing unit PS outputs an alarm.

The − first-order reflection-diffracted light R1 (−) generated from the beam R1 projected to the diffraction grating G2 on the scale 20 travels obliquely from the scale and then passes through the transparent substrate on which the diffraction gratings G1, G3 are formed, to be detected by the photodetector PDZ2.

A quantity of the received light is one reflecting a change in quantity of light due to grating nonuniformity of the diffraction grating G2 on the scale or a change in quantity of emission light of the light source (due to a change in ambient temperature or degradation of light source element, etc.). Then a light-quantity anomaly alarm signal (LIGHT POWER ALARM) is output as a pulse signal when an output from the photodetector PDZ2 becomes smaller or larger than a set value Vref3 in a comparator COMP3 in the detection circuit DC. Receiving the light-quantity anomaly alarm signal, the signal processing unit PS, for example, generates an alarm sound or displays an alarm indication.

Figure 5:
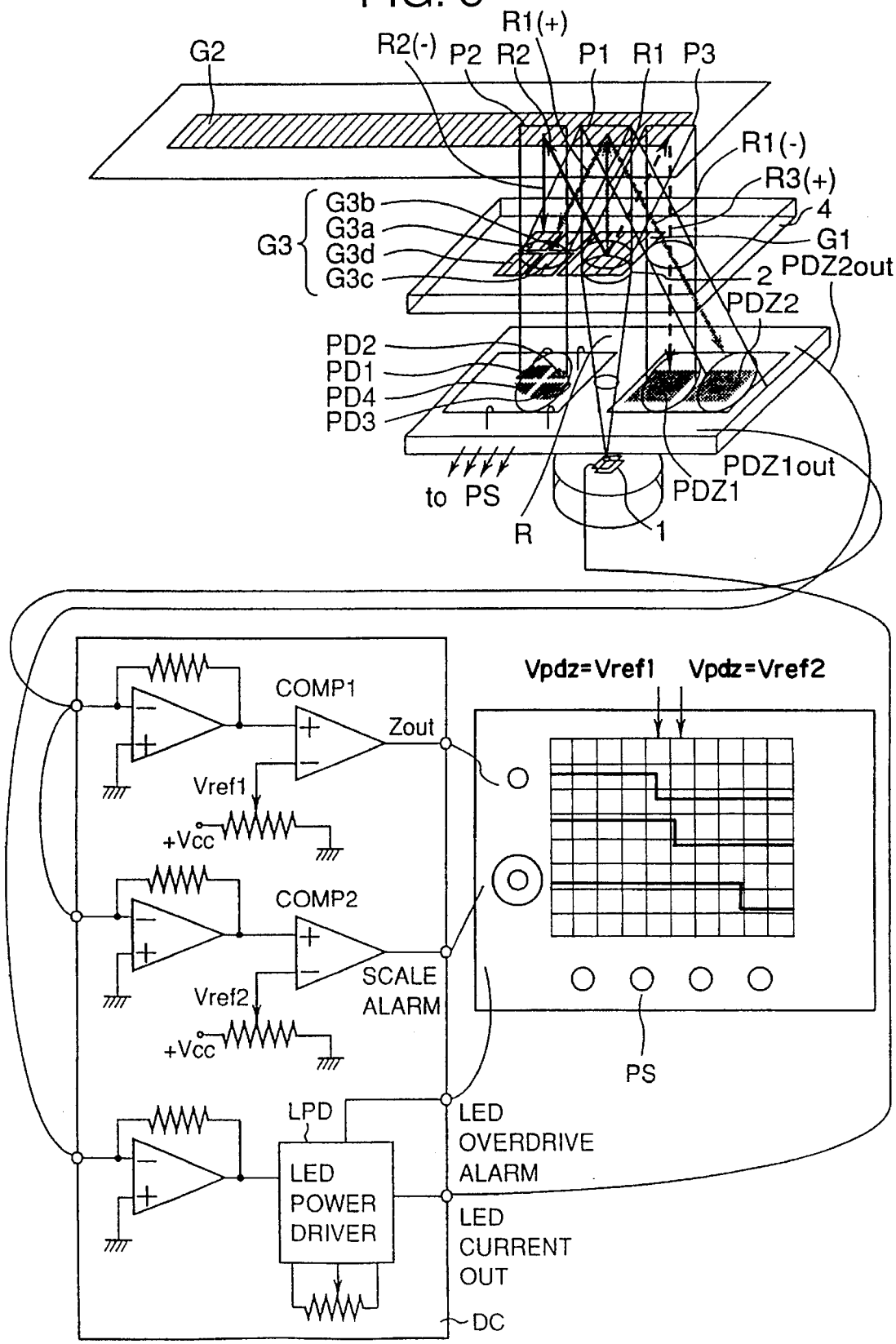
FIG. 5 is an explanatory drawing of a modification of the second embodiment.

FIG. 5 shows a modification of the second embodiment. The same members are denoted by the same reference numerals as those in FIG. 4, and description thereof will be omitted herein. In the present modification, the output from the photodetector PDZ2 is fed as light-quantity information back to a LED power driver LPD, and the LED power driver LPD is arranged to control the emission amount of the light-emitting device 1 so as to keep the output from the photodetector PDZ2 constant. When a LED drive current as controlled by the LED power driver LPD exceeds a fixed value, a light-source anomaly alarm signal (LED OVER-DRIVE ALARM) is output from the LED power driver LPD to the signal processing unit PS. Receiving the light-quantity anomaly alarm signal, the signal processing unit, for example, generates an alarm sound or displays an alarm indication.

The second embodiment (including the modification) has such an effect that the detection of anomaly of light source and the control of light quantity can be performed in a very simple and compact structure by simply adding the photodetectors PDZ1 and PDZ2, and in addition, has the following advantages:

(1) Since no extra optical system for detecting the anomaly of light source is necessary, the apparatus is compact and saves space and energy.

(2) Since waste diffracted light is utilized out of the light beam projected for measurement of displacement amount, modulated light can be obtained in a sufficient quantity of light and signals with good S/N can be obtained; the reliability is high because the light quantity of the diffracted light of the same beam as the encoder signal is monitored.

(3) Since the reflected light by the diffraction grating pattern on the scale is detected, stability of the encoder signal can be improved if the control is effected so as to keep the light quantity constant, which enables measurement with higher resolution. Also in this case, the reproducibility accuracy is improved for detection of the grating edge measured by the photodetector for detecting the origin.

(4) Since the photodetectors PDZ1, PDZ2 can be mounted on the same surface (for example, on the same substrate) as the photodetectors PD1 to PD4 are, the structure is simple and the assembling property is good.

If the second embodiment as described above is further arranged in such a structure that, letting VPDZ1 and VPDZ2 be outputs from the origin detecting photodetector PDZ1 and the diffracted light quantity monitoring photodetector PDZ2, respectively, VPDZ2/VPDZ1 is preliminarily calculated by an electronic circuit or computer and is input to COMP1, the reproducibility accuracy of detecting the grating edge can be kept high even with a change in quantity of emission light.

Figure 6:
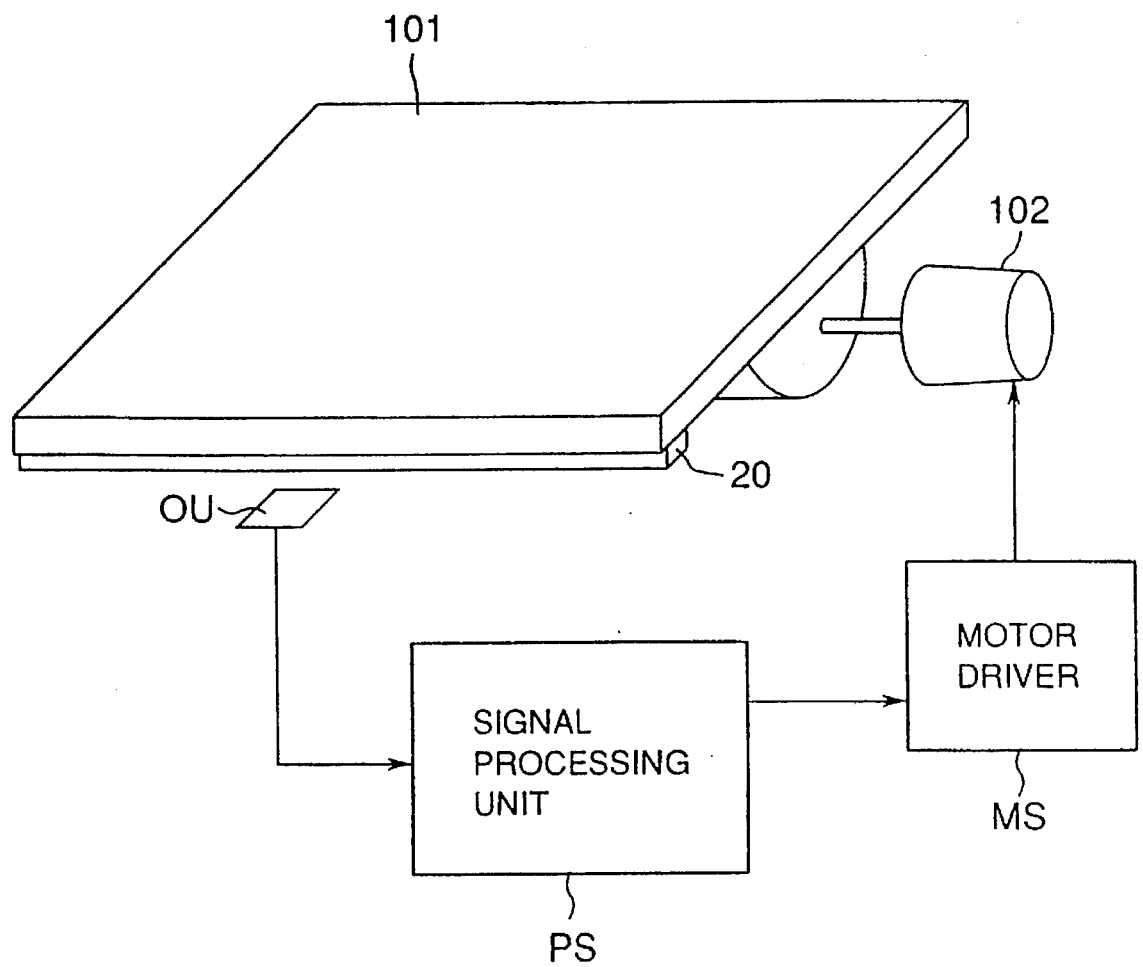
FIG. 6 is an explanatory drawing of a stage drive system into which the optical encoder is incorporated.

FIG. 6 is a schematic drawing to show a construction of a stage drive system into which the optical encoder of the first or second embodiment (including the modifications) is incorporated. In the drawing, reference numeral 101 designates a movable stage, movement of which is controlled by an unrepresented guide and to a lower surface of which the scale 20 is fixed. Numeral 102 denotes a servo motor for driving the movable stage 101, which drives the stage 101 through a ball screw mechanism. 0U represents an optical unit set on the stationary side, in which the light-emitting device 1, transparent substrate 4, photodetector PD1, etc. as described above are set, PS the signal processing unit, and MS a motor drive circuit for drive-controlling the servo motor 102, based on a control signal from the signal processing unit PS. The signal processing unit PS outputs a command signal to the motor control unit MS so as to displace the stage 101 to a determined position, based on the displacement information obtained as described previously. The present apparatus can enjoy the aforementioned effects, thereby achieving an apparatus which can detect the origin, the anomaly of light quantity, etc. without an increase in size of the displacement detecting portion.

In either case of the drawings of the above embodiments, the optical system for irradiating the linearly converging beam is composed of only one anamorphic optical element 2, but it can be a combination of a cylindrical lens with a spherical lens or the like, or, depending upon the purpose of encoder, may be an optical system composed only of a cylindrical lens to form the linearly converging beam or an optical system for illuminating the diffraction grating G2 on the scale 20 with a nearly parallel beam only by a spherical lens or with a diverging beam as it is without using a lens.

A ratio of light quantity balance between the diffracted light R1, R2, R3 may be modified by changing a cross-sectional configuration of the diffraction grating G1.

According to the embodiments as described above, different information from the relative displacement information to the diffraction grating can be attained using conventionally waste light without making the structure complex.

In particular, the embodiments achieved the apparatus which was able to obtain the origin of the diffraction grating, the position of the grating edge of the diffraction grating, or the output from the light-emitting device as the different information without making the structure complex.

What is claimed is:

1. An apparatus for detecting a displacement of a diffraction grating provided on an object to be measured, comprising:

a light-emitting device;

a separation optical element for separating a beam from said light-emitting device into a plurality of beams;

a multiplexing optical element for multiplexing light beams respectively diffracted by said diffraction grating from two beams out of said plurality of beams;

a first detecting unit for detecting interference light generated when the beams of diffracted light are multiplexed by said multiplexing optical element and outputting a signal related to relative displacement information to said diffraction grating; and a second detecting unit for outputting a signal related to information different from said relative displacement information to said diffraction grating, based on a change in a diffracted light quantity of diffracted light by said diffraction grating from another beam from said plurality of beams and/or another diffracted light by said diffraction grating from said two beams.

2. The apparatus according to claim 1, wherein said second detecting unit outputs a signal related to an origin of said diffraction grating, a position of a grating edge of said diffraction grating, or an output from said light-emitting device as said different information.

3. The apparatus according to claim 1, wherein said separation optical element has a diffraction grating for separation of beam and said second detecting unit outputs the signal related to said different information, based on a change in a diffracted light quantity of re-diffracted light by said diffraction grating from diffracted light coming from said diffraction grating for separation of beam and not used by said first detecting unit.

4. The apparatus according to claim 1, wherein said first detecting unit and second detecting unit have respective detectors provided on a same surface.

5. The apparatus according to claim 1, wherein said second detecting unit outputs a signal related to a position of a grating edge of said diffraction grating and has means for generating an alarm, based on said signal.

6. The apparatus according to claim 1, wherein said separation optical element has a diffraction grating for separation of beam and wherein said second detecting unit outputs signals respectively related to an origin and a position of a grating edge of said diffraction grating, based on a diffracted light quantity change of re-diffracted light by said diffraction grating from diffracted light coming from said diffraction grating for separation of beam and not used by said first detecting unit, and outputs a signal related to an output from said light-emitting device, based on a diffracted light quantity change of re-diffracted light not used by said first detecting unit out of the re-diffracted light by said diffraction grating from diffracted light coming from said diffraction grating for separation of beam and used by said first detecting unit.

7. The apparatus according to claim 1, wherein said second detecting unit outputs a signal related to an output from said light-emitting device and further has means for controlling the light-emitting device, based on said signal.

8. A drive system comprising:

a diffraction grating provided on an object to be measured;

a light-emitting device;

a separation optical element for separating a beam from said light-emitting device into a plurality of beams;

a multiplexing optical element for multiplexing light beams diffracted by said diffraction grating from two beams out of said plurality of beams;

a first detecting unit for detecting interference light generated when the beams of diffracted light are multiplexed by said multiplexing optical element and outputting a signal related to relative displacement information to said diffraction grating;

a second detecting unit for outputting a signal related to information different from said relative displacement information to said diffraction grating, based on a change in a diffracted light quantity of diffracted light by said diffraction grating from another beam from said plurality of beams and/or another diffracted light by said diffraction grating from said two beams; and a position control portion for executing relative drive of said measured object, based on an output from said first detecting unit.

* * * * *

UNITED STATES PATENT AND TRADEMARK OFFICE
CERTIFICATE OF CORRECTION

PATENT NO.  : 5,569,913
DATED       : October 29, 1996
INVENTOR(S) : Ishizuka et al.

It is certified that error appears in the above-indentified patent and that said Letters Patent is hereby corrected as shown below:

COLUMN 1:

Line 47, "the- first" should read --the - first--; and
Line 51, "$\pi K/4$" should read --$\pi/4$--.

COLUMN 2:

Line 41, "accoding" should read --according--.

COLUMN 3:

Line 3, "+first-" should read --+ first---; and
Line 8, "+first-order" should read --+ first-order--.

COLUMN 5:

Line 7, "generate+first-" should read --generate + first---;
Line 12, "The+first-order" should read --The + first-order--; and
Line 66, "Vref2" should read --Vref1--.

UNITED STATES PATENT AND TRADEMARK OFFICE
CERTIFICATE OF CORRECTION

PATENT NO. : 5,569,913
DATED      : October 29, 1996
INVENTOR(S): Ishizuka et al.

It is certified that error appears in the above-indentified patent and that said Letters Patent is hereby corrected as shown below:

COLUMN 6:

Line 7, "Vref2" should read --Vref1--.

COLUMN 7:

Line 28, "0U" should read --OU--.

Signed and Sealed this

First Day of April, 1997

Attest:

BRUCE LEHMAN

Attesting Officer

Commissioner of Patents and Trademarks